Dec. 16, 1941.    H. M. BIEBEL    2,266,148
OFF-PEAK WATER HEATING SYSTEM
Filed March 27, 1941
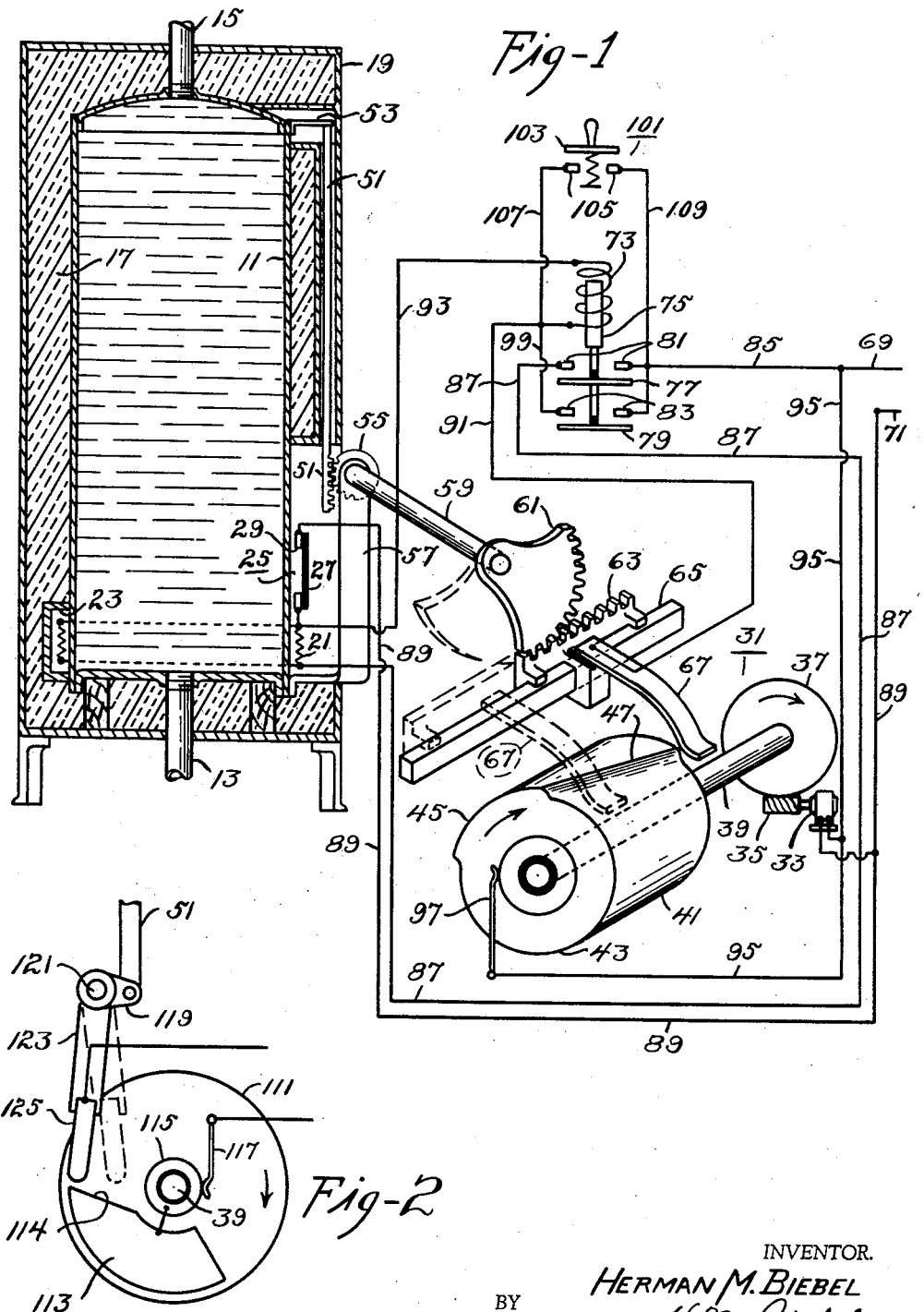
INVENTOR.
HERMAN M. BIEBEL
BY
H M Biebel
ATTORNEY.

Patented Dec. 16, 1941

2,266,148

UNITED STATES PATENT OFFICE 2,266,148

OFF-PEAK WATER HEATING SYSTEM

Herman M. Biebel, Elgin, Ill., assignor to McGraw Electric Company, Elgin, Ill., a corporation of Delaware Application March 27, 1941, Serial No. 385,448

3 Claims. (Cl. 219—39)

My invention relates to electric heating systems and particularly to off-peak water heating systems for domestic hot water tanks.

An object of my invention is to provide a relatively simple hot water heating system for controlling the energization of a heater applied to an ordinary domestic hot water tank.

Another object of my invention is to provide an off-peak water heating system embodying a minimum number of relatively simple component operating parts and effective to either start energization of a tank heating element at the start of an off-peak period or to delay said energization in accordance with the amount of hot water in the tank.

Other objects of my invention will either be apparent from a description of a system embodying my invention or will be pointed out during such description and set forth in the appended claims.

In the single sheet of drawings:

Figure 1 is a diagrammatic view of a system embodying my invention shown generally only and as applied to a domestic hot water tank, and, Fig. 2 is a fragmentary view of a modified form of elements embodying my invention.

I have shown an ordinary hot water tank 11 of the ordinary cylindrical elongated type provided with a cold water inlet pipe 13 and a hot water outlet pipe 15. I may also provide heat insulating material 17 around the tank 11 which may be protected by an outer cover 19.

I provide an electric heating element 21 which is shown generally only as being adapted to be mounted around the lower portion of the tank by any suitable means now well known in the art and in order to permit of easily and quickly removing the heater in case of failure thereof, I may locate the heater in a tunnel member 23. I desire it to be understood, however, that these details constitute no part of my invention and may be changed as desired for other details of construction effective for the same purpose.

I provide a thermal heater control switch 25 here shown as embodying a bimetal bar 27 having one end thereof mounted on a fixed contact or support subject to the temperature of either the tank or of the water in the tank. The free end of bimetal bar 27 may engage and move away from a fixed contact member 29. Here again I desire to point out that the thermal heater control switch 25 is shown generally only, for illustrative purposes, and any other thermal switch now known in the art may be used by me in place of the switch shown in the drawing.

I provide a continuously operative timer designated in its entirety by numeral 31, which timer includes a continuously operative electric motor 33 connected to supply circuit conductors 60 and having a worm gear 35 mounted on its shaft. The worm gear is adapted to mesh with and drive a worm wheel 37 which is shown as being mounted on and rotatably supported by a shaft 39. The details of the continuously operative timer are general only and are intended to represent a timer or timing means operative to cause rotation of the shaft 39 through one complete revolution during a twenty-four hour period.

I provide an electric conducting member 41 of substantially cylindrical form which may be insulatedly mounted on shaft 39. While I have not shown any supporting bearings for the shaft 39, these are to be understood as being provided, all in a manner well known in the mechanical art. The greater portion of the periphery of member 41 has a certain uniform outer radius and this portion 43 represents the on-peak period while an off-peak period is represented by a portion 45 which has a somewhat larger outer radius. As shown by the arrow on the end face of member 41, it is to be understood as being turned in a clockwise direction by the transmitting means connecting it with the motor 33. While the trailing edge of portion 45 extends in a straight axial direction, the leading edge 47 of portion 45 extends angularly relatively to the longitudinal axis of said shaft 39. This is for a purpose which will presently appear.

I provide a thermally responsive means 51 on the tank 11 as by supporting the upper end of a metallic bar 51 having a relatively small coefficient of expansion with increase of temperature, by a bracket 53 supported from or secured to the upper end of tank 11. The lower end of bar 51 has teeth therein to constitute a rack bar meshing with a pinion 55 which is shown generally as being rotatably supported by a bracket member 57 which is supported from the lower end of tank 11. When the water in the tank is hot the lower end of thermal element 51 is farther from the lower end of the tank than it is when the tank contains an appreciable amount of cold water or is entirely filled with cold water so that a shaft 59 on which pinion 55 is fixedly mounted will be caused to turn in accordance with changes in the temperature of the water in the tank. It will be noted that the thermal element 51 is adapted to integrate the temperature of the water in the tank or to be responsive to the average temperature of the water in the tank or to the heat content of the tank since, as above stated, I prefer to use a non-expansible member and to permit the expansion and contraction of the tank in a longitudinal direction to vary the relative position of the lower end of member 51. Shaft 59 has mounted thereon a gear segment 61 which is adapted to mesh with a movably supported rack bar 63. This rack bar may, for instance, be mounted on a fixedly supported bar 65 so that turning movement of pinion 55, shaft 59, and gear segment 61 will cause movement of the rack bar member 63 longitudinally along its support 65. While no specific supports are shown for the bar 65, it is to be understood that any suitable means of supporting this bar will be provided. It may here be noted that these members are shown on an enlarged scale for the sake of clearness.

A contact arm or spring brush 67 is insulatedly mounted on, supported by and movable with the rack bar 63 and it is to be pointed out that this movement of brush 67 is in a substantially axial direction relatively to the length of member 41 or axially of shaft 39.

I have indicated a pair of supply circuit conductors 69 and 71 as well as an electromagnetic heater control switch including a coil 73, a magnetizable core member 75, a main contact bridging member 77 and an auxiliary contact bridging member 79 suitably mechanically connected with core member 75. The main bridging member 77 is adapted to be engaged with and disengaged from a pair of fixed contact members 81 while the auxiliary bridging member 79 is adapted to engage with and be disengaged from fixed contact members 83.

A conductor 85 connects supply circuit conductor 69 with one of the contact members 81 and 79. The other fixed contact member 81 is connected by a conductor 87 with one terminal of the heater 21, the other terminal of which is connected with the fixed end of bimetal bar 27. Contact 29 of the thermal switch 25 is connected by a conductor 89 with the other supply circuit conductor 71. One terminal of coil 73 of the contactor is connected by a conductor 93 with the other terminal of heater 21 and therefore to the fixed end of bimetal bar 27. Supply circuit conductor 69 is connected by a conductor 95 with a brush 97 supported in such manner as to be in continuous electric engagement with member 41.

Let it be assumed that the tank contains a relatively large amount of cold water which would result in the parts hereinbefore described of the thermally actuable contact member 67 being in the position shown in Fig. 1 of the drawing. The position of member 41 rotated continuously by the timing means is that just before the start of an off-peak period and, for illustrative purposes, this may be considered to be at the hour of 10 p. m. with the full length of an off-peak period being eight hours, so that the off-peak period will be considered to end at 6 a. m. As soon as brush 67 engages the leading edge 47 of the peripheral portion 45 of member 41 an energizing circuit through coil 73 will be established as follows: From supply circuit conductor 69 through conductor 95 and brush 97 into and through member 41, from there to and through the engaged brush 67 and conductor 91, through coil 73 and through conductor 93, to and through the engaged members 27 and 29 and from there through the conductor 89 to the other supply circuit conductor 71. This will cause upward movement of the two contact bridging members, the engagement of contact bridging member 77 with the fixed contact members 81 providing an energizing circuit through the heater 21 substantially as follows: From supply circuit conductor 69 through conductor 85, the engaged contact members 77 and 81, through conductor 87, through heater 21 and the thermal switch 25 and from there through conductor 89 to the other supply circuit conductor 71. Since one object of my invention is to provide a relatively simple system for effecting energization of the heater of a hot water tank at a time either substantially at the start of an off-peak period in case the tank contains a relatively large amount of cold water or at a later period in an off-peak period, that is, after a certain time interval, the inclined leading edge 47 of the portion 45 together with the adjustable contact member movable in accordance with the temperature of the water in the tank will effect such control. I have shown, in the broken lines in Fig. 1 of the drawing, the position occupied by the contact arm 67 and its support 63, as well as that of the gear segment 61 in case the tank contains a relatively large amount of hot water whereby member 67 has been moved to another position longitudinally of the axis of the shaft 39 whereby engagement by the brush 67 and the leading edge of brush 45 will be delayed. It may here be pointed out that the design, construction and adjustment of these cooperating elements is such that any desired length of delay period, after the start of an off-peak period, may be obtained as on the order of one, two or perhaps more hours.

A holding circuit for coil 73 was also closed and may be traced as follows: From supply circuit conductor 69 through conductor 85, the engaged contact members 79 and 83, through a conductor 99 to one terminal of coil 73, through conductor 93 and the closed thermal switch 25 and from there through conductor 89 to the other supply circuit conductor 71. It is obvious that this holding circuit is not dependent on the engagement of brush 67 with portion 45 of member 41 so that energization of the coil 73 will continue beyond the end of an off-peak period when brush 67 is out of engagement with the continuously movable electric conducting surface represented generally by portion 45 of member 41.

This operation of the electromagnetic switch is a very desirable one under the following conditions. Let it be assumed that the tank contained a relatively large amount of hot water at the start of the off-peak period and that the tank was heated at such a rate that bimetal bar 27 moved out of engagement with contact member 29 to effect deenergization of the electromagnetic switch and of the heater 21 sometime, say an hour or so, before the end of the off-peak period. At this time brush 67 would still be in engagement with portion 45 and should it happen that such an amount of hot water was withdrawn from the tank, before the end of an off-peak period, the hereinbefore described energizing circuit through coil 73 and therefore the energizing circuit through heater 21 would be reestablished and even though the continuously operative timer would effect disengagement of the contact portion 45 from brush 67 at the end of an off-peak period, energization of the heater would continue beyond the end of an off-peak period. This energization of heater 21 would continue until substantially all of the water in the tank is hot.

As it may be desirable to effect energization of the electromagnetic switch and therefore of the heater 21 during an on-peak period, I provide a normally open push button switch 101 shown as including a contact bridging member 103 adapted to be normally engaged with fixed contact members 105. One of these contact members 105 is connected by a conductor 107 to conductor 99 and therefore to one terminal of coil 73. The other fixed contact 105 is connected by a conductor 109 with one of the fixed contact members 81 and therefore with conductor 85. Normally pressure on the switch 101 will effect energization of the hereinbefore described circuit through coil 73 and therefore closure of the heating circuit through heater 21 hereinbefore described, as well as the holding circuit hereinbefore described. Thus in case of extraordinary demands for hot water during the day, above and beyond the usual amount for which the elements of the system have been designed and adjusted, the user can obtain a full tank of hot water in case such emergency demand arises.

I have shown, in Fig. 1 of the drawing, a metallic member 41 but it is to be understood that I may provide a cylindrical member of electric insulating material and mount thereon a contact surface having an angularly extending leading edge and a straight axially extending trailing edge and that a suitable slip ring may be insulatedly mounted on the member of electric insulating material, which slip ring is adapted to be engaged by brush 97, all in a manner well known in the art.

Referring now to Fig. 2 of the drawing, I have there shown a modification of the contact members controlled respectively in accordance with time and with the average or integrated temperature of the water in the tank. I have shown a disk 111, of electric insulating material, having fixedly mounted thereon a contact surface 113, the maximum peripheral extent of which is substantially that of the length of an off-peak period the leading edge 114 extending angularly relative to a radial line. This disk may be considered to be rotated in a clockwise direction by the electric motor 33 and to be mounted on shaft 39. A slip ring surface 115 may be provided electrically connected with or a part of contact surface 113 which may be engaged by a contact brush 117. Rod 51, a part of the thermally responsive means hereinbefore described, may be connected to the short arm 119 of a bell crank lever pivotally mounted on a fixed pin 121 having a second longer arm 123. A contact arm or resilient brush 125 is fixedly mounted on and supported by arm 123 and if arm 123 is of metal, arm 125 will be electrically insulated therefrom. The design, construction and location of the parts shown in Fig. 2 of the drawing are such that the arm 125 will occupy substantially the position shown by the full lines in Fig. 2 when the water in the tank has a relatively low average temperature or in case the tank contains a relatively large amount of cold water so that energization of the circuit hereinbefore described will be effected either substantially at the start of an off-peak period or shortly thereafter. I have shown, in broken lines, the position of elements 123 and 125 which they will occupy when a relatively large amount of hot water is in the tank and it will be noted that the disk 111 must be rotated more before engagement of contact 125 with the leading edge 114 of surface 113 will occur because of the angular leading edge and the relative movement of contact 125 than would be necessary when the tank contains a relatively large amount of cold water.

My improved off-peak water heating system including a continuously movable contact surface electrically connected in a control circuit and a cooperating contact responsive to the average or integrated temperature of the water in the tank, is therefore effective to energize the heater of a hot water tank at either the start of an off-peak period or shortly thereafter or after a delay period, the length of which increases with the amount of hot water in the tank at the start of an off-peak period.

Various modifications may be made in the system embodying my invention without departing from the spirit and scope of the invention and I desire that all such modifications clearly coming within the scope of the appended claims shall be considered to be covered thereby.

I claim as my invention:

1. In an off-peak water heating system for a tank having an electric heater, an electromagnetic switch for said heater, a continuously operative timer, an electric contact plate adapted to be rotated by said timer and having an angularly-extending leading edge, a movable contact brush, thermally-actuable means responsive to the average tank water temperature for moving said contact brush relatively to the leading edge of said contact plate to cause engagement between said contact plate and said brush earlier when the average temperature of the water in the tank is low than when it is high and electric connections between said movable contact brush, said contact plate and said electromagnetic switch to cause energization of said electromagnetic switch and of the electric heater upon engagement of said brush with said contact plate in case substantially less than all of the water in the tank is hot and a thermally-actuable heater control switch for causing deenergization of the heater when substantially all of the water in the tank is hot.

2. In an off-peak water heating system for a tank having an electric heater, an electromagnetic and a thermally-actuable switch connected in series electric circuit with each other and with the electric heater for controlling the energization of the heater, a continuously operative timer, an electric conducting plate having a maximum width equal to the length in time of an off-peak period, an angularly extending leading edge and adapted to be rotated once in twenty-four hours, a movable contact brush, thermally-actuable means responsive to the average temperature of the water in the tank for moving said movable contact brush relatively to the leading edge of said contact plate to cause earlier engagement between said contact plate and said movable brush when the average temperature of the water in the tank is low than when it is high and electric connections between said heater, said two switches and said movable contact brush to cause energization of said electromagnetic switch and of the electric heater upon engagement of said contact brush with said contact plate in case substantially less than all of the water in the tank is hot, to cause deenergization of said heater as soon as substantially all of the water in the tank is hot, to cause reenergization of said heater in case the heater was deenergized before the end of an off-peak period and withdrawal of a substantial quantity of hot water from the tank occurred before the end of an off-peak period.

3. A system as set forth in claim 2 and including a normally open switch operable into momentarily closed position to cause energization of said electromagnetic switch and of said heater at any desired time during an on-peak period in case less than all of the water in the tank is hot, said energization of the heater continuing until substantially all of the water in the tank is hot.

HERMAN M. BIEBEL.